US009058119B1

(12) United States Patent
Ray, III et al.

(10) Patent No.: US 9,058,119 B1
(45) Date of Patent: Jun. 16, 2015

(54) EFFICIENT DATA MIGRATION

(75) Inventors: Fountain L. Ray, III, Orlando, FL (US);
Anthony Metz, Berkeley Springs, WV (US)

(73) Assignee: NetApp, Inc., Sunnyvale, CA (US)

( * ) Notice: Subject to any disclaimer, the term of this patent is extended or adjusted under 35 U.S.C. 154(b) by 1019 days.

(21) Appl. No.: 12/685,250

(22) Filed: Jan. 11, 2010

(51) Int. Cl.
*G06F 3/06* (2006.01)
*H04L 12/00* (2006.01)
*H04L 29/08* (2006.01)

(52) U.S. Cl.
CPC ............. *G06F 3/0647* (2013.01); *H04L 12/00* (2013.01); *H04L 67/148* (2013.01)

(58) Field of Classification Search
USPC ......................................................... 709/217
See application file for complete search history.

(56) References Cited

U.S. PATENT DOCUMENTS

| 7,107,421 | B2 * | 9/2006 | Kaneda et al. ................. 711/162 |
| 8,069,323 | B2 * | 11/2011 | Sudo et al. .................... 711/162 |
| 2002/0141379 | A1 * | 10/2002 | Davari et al. .................. 370/351 |
| 2003/0088671 | A1 * | 5/2003 | Klinker et al. ................ 709/225 |
| 2005/0163093 | A1 * | 7/2005 | Garg et al. .................... 370/342 |
| 2006/0085607 | A1 * | 4/2006 | Haruma ........................ 711/161 |
| 2007/0006020 | A1 * | 1/2007 | Fujita ............................... 714/6 |
| 2007/0043874 | A1 * | 2/2007 | Nath et al. .................... 709/230 |
| 2007/0220071 | A1 * | 9/2007 | Anzai et al. .................. 707/204 |
| 2009/0234984 | A1 * | 9/2009 | Chaitanya et al. ............. 710/33 |

\* cited by examiner

*Primary Examiner* — Angela Nguyen
(74) *Attorney, Agent, or Firm* — Cooper Legal Group, LLC

(57) ABSTRACT

One or more techniques and/or systems are disclosed that provide for improved speed and efficiency when transferring data from a source data storage device to a destination data storage device in a data storage network. A data storage network is configured such that a source data storage device, a destination data storage device and a migration server can communicate with each other. Both a source data storage drive and a destination data storage drive are mapped to the migration server. The migration server identifies controllers coupled to the data storage network for the source and destination data storage drives. A route of data transfer is mapped from the source data storage drive to the destination data storage drive through the identified controllers, and the data is transferred from the source data storage drive to the destination data storage drive using the mapped route of data transfer.

20 Claims, 10 Drawing Sheets

EFFICIENT DATA MIGRATION

BACKGROUND

Business entities and consumers are storing an ever increasing amount of digitized data. For example, many commercial entities are in the process of digitizing their business records and/or other data. Similarly, web based service providers generally engage in transactions that are primarily digital in nature. Thus, techniques and mechanisms that facilitate efficient and cost effective storage of vast amounts of digital data are being implemented.

New data storage technologies are continuing to be developed and implemented by both commercial enterprises and consumers. Often, to help link remote (or even locally dispersed) locations that require access to stored data, and/or to ensure that such data remains available in the event of hardware, software, or even site failures (e.g., power outages, sabotage, natural disasters), entities have developed clustered networks that link disparate storage in a network available to a plurality of clients, for example.

As data storage requirements and/or management needs of a data management and storage network increase, such as for an enterprise, components of the network may be replaced and/or upgraded. For example, an administrator may wish to replace two storage servers that can each store X amount of data with a single, more modern storage server that can store 2X data and has a faster data read time. In this example, data stored in the two storage servers will need to be transferred to the single replacement storage server prior to taking the two original storage servers out of the network.

However, data migration from a source location (e.g., the two storage servers being replaced) to a destination location can be complex and take a long-time. Further, access to the data being migrated is typically unavailable or at least limited during the transfer. Typically, data is transferred from the source location to the destination location on a block-level. That is, data is copied byte-by-byte, in memory blocks, from the source to the destination. The type of data, file-type, or way it is stored does not affect this type of data migration, as the data is merely copied in block form and written to the destination in block form. As an example, the source location may comprise virtual volumes (e.g., disparate memory blocks on physical drives that are emulated as a single volume of data to the storage network), which further comprises virtual drives (or pseudo-drives) (e.g., disparate memory blocks in the volume that are emulated as a single drive, such as a hard-drive, to the storage system). One example of a virtual drive is a Logical Unit Number (LUN) drive, which is identified by numbers that represent network memory locations of the data stored by the LUN.

Often, when replacing or upgrading a data storage unit, the replacement unit is different than those that are being replaced, and are therefore said to be "heterogeneous" (e.g., not the same). Copying data between storage volumes residing on heterogeneous (e.g., different types and/or manufacturers) storage systems is common when storage systems are being replaced and data is migrated to the replacements from those volumes being replaced. In an enterprise data storage and management environment the data migration typically involves large-scale block-level migration, which can be performed by connecting drive locations and transferring the data from the source to the destination over the connection, such as a storage network fabric (e.g., network connections).

Currently, techniques and/or systems utilize software and hardware that identifies the source and the destination, identifies a link between the two, and then semi-automatically transfers the data on a block-level. However, currently, the transfers do not identify a fastest path for data transfer, merely an available one, which can dramatically increase transfer times (e.g., by two to three time). Further, the current techniques and/or systems may not provide for automated error checking, where errors may occur during heterogeneous data transfers, for example. Additionally, if a data transfer error does occur during the migration, currently, the entire batch of data would need to be retransferred, which can lead to increased migration times.

SUMMARY

Aspects of the present disclosure propose to identify desired (e.g., optimal) data transfer paths, provide for error checking, and transfer data in subsets, and thus provide for improved migration speed and efficiency.

This disclosure relates to techniques and systems that provide for improved speed and efficiency when transferring data from a source data storage device to a destination data storage device in a data storage network. In one embodiment, a data storage network is configured in such a way so that a migration server (e.g., a component linked to the network that facilitates data migration) can communicate with both a source data storage device, such as a data storage server (e.g., having physical disk, comprising virtual volumes), and a destination data storage device. A data storage drive (e.g., a virtual drive, such as a Logical Unit Number (LUN)) from the source data storage device and a data storage drive from the destination data storage device can be mapped to the migration server, for example, by presenting the appropriate network location identification.

In this embodiment, controllers that are coupled to the data storage network are identified, one respectively for the source and destination data storage drives, which manage the respective drives, using the migration server. Further, a plurality of ports for the respective controllers can be identified, if available. This determines a priority communications path for the source and destination data storage drives, for example, to the migration server over the network. A route of data transfer is determined (e.g., mapped) from the source data storage drive to the destination data storage drive through the identified controllers, and through respective plurality of ports (if available), and the data is transferred from the source data storage drive to the destination data storage drive using the preferred route of data transfer, such as one or more that provide an efficient (e.g., fastest) communication path.

In this way, for example, the data transfer utilizes the preferred route identified, where the route utilizes the controllers (e.g., and associated ports) that directly manage the source and destination drives. Clustered storage networks typically have a plurality of drives that can be accessed by the plurality of controllers from other nodes, for example. However, if a data transfer route is mapped from the controllers that directly manage the respective drives, data transfer speed can be improved.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
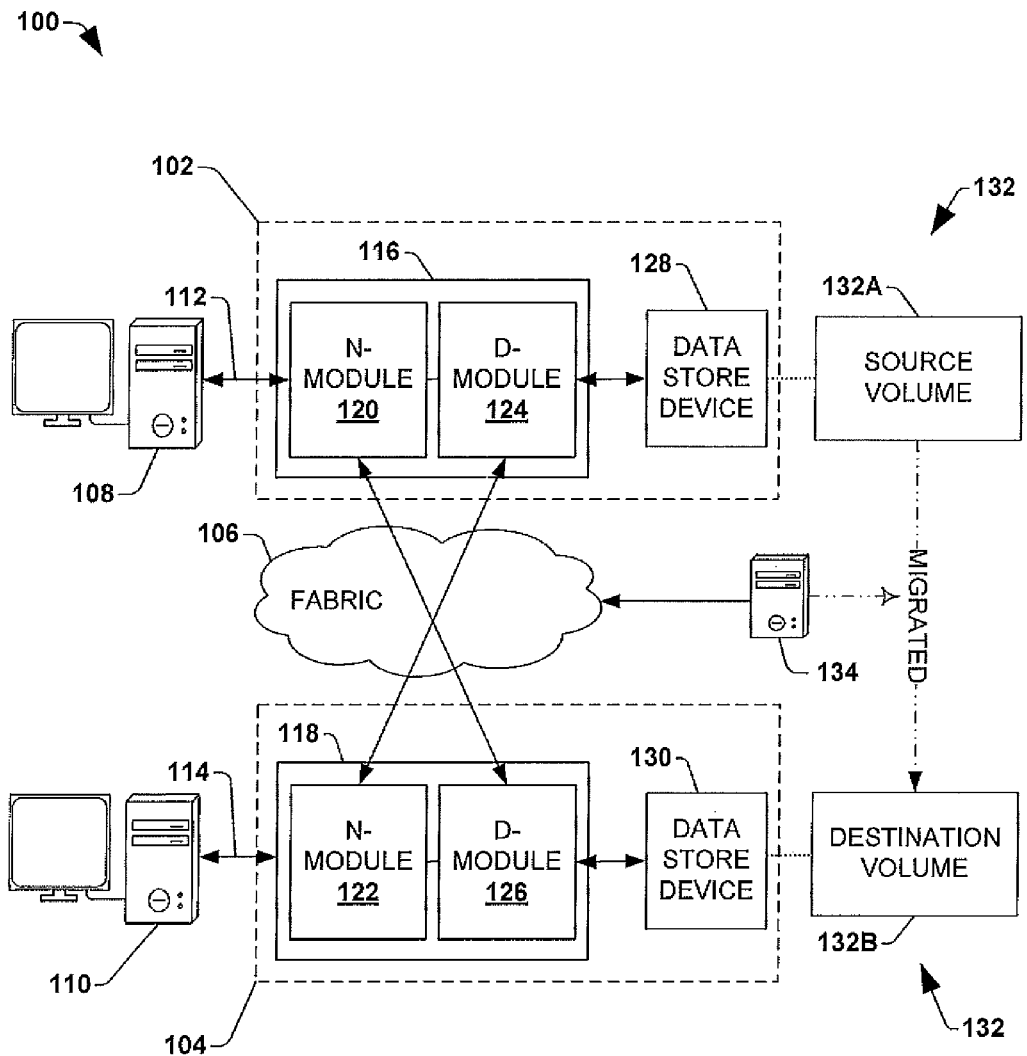
FIG. 1 is a component block diagram illustrating an example clustered network in accordance with one or more of the provisions set forth herein.

Some examples of the claimed subject matter are now described with reference to the drawings, where like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

A data migration involving large-scale block-level migration of logical unit number (LUN) drives, for example, can be cumbersome and prone to operator error. The migration is typically reliant on migration engineers to prepare systems and perform the steps of the migration. To provide for efficient resource utilization and improved data migration time, the present disclosure presents one or more semi-automated, improved methods and/or systems for transferring data from a source volume to a destination volume, utilizing a migration appliance.

Figure 2:
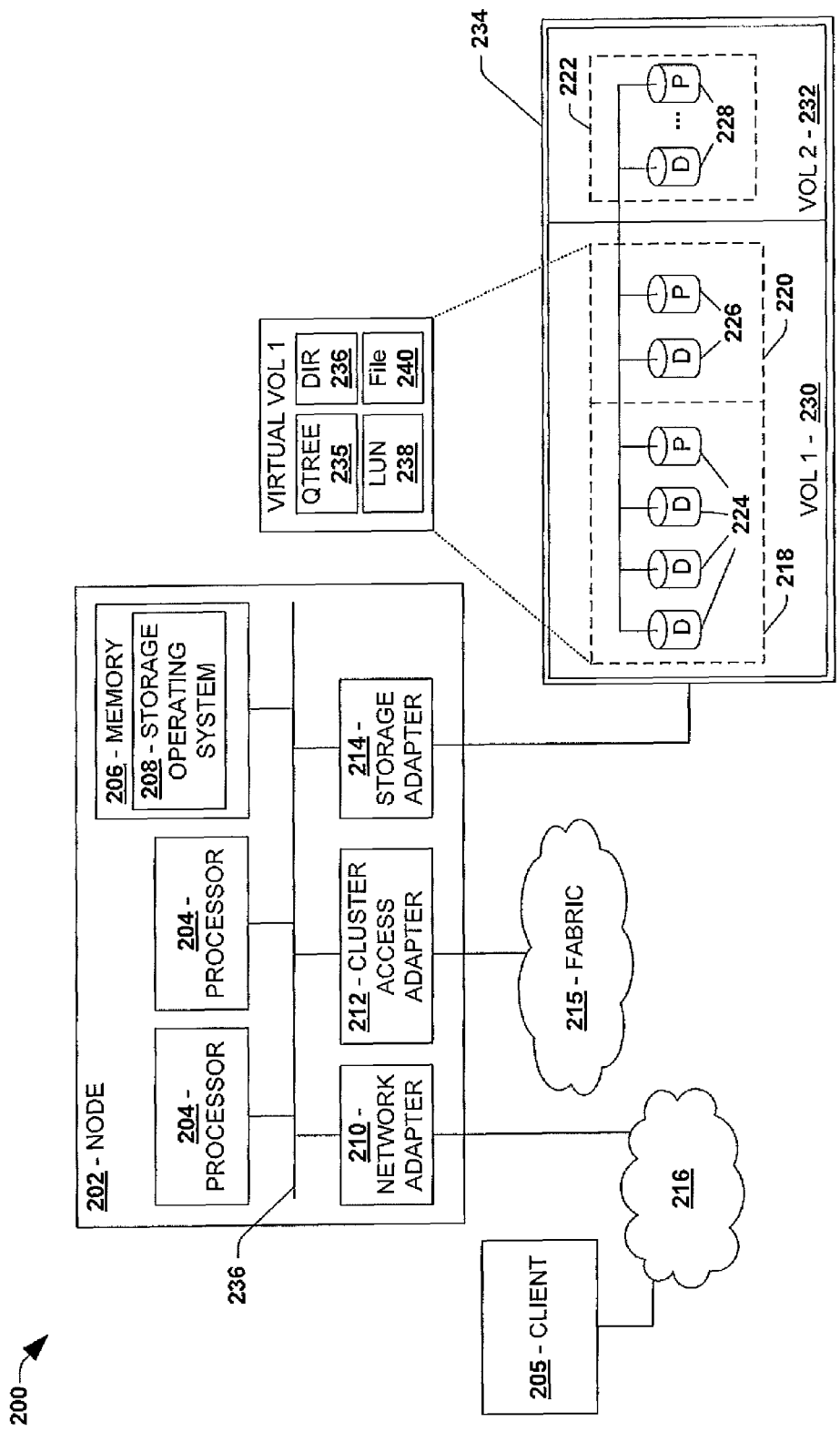
FIG. 2 is a component block diagram illustrating an example data storage system in accordance with one or more of the provisions set forth herein.

To provide a context for an embodiment of how data migration may be implemented, FIG. 1 illustrates a clustered network environment 100, for example, whereon source and destination volumes may reside, and FIG. 2 illustrates an embodiment of a data storage system that may be implemented to store and manage data in this clustered network environment. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays as a filesystem for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

In one embodiment, as illustrated by the example environment 100 of FIG. 1, the data storage device 128 may comprise a source volume 132A (e.g., a source providing a source of data to be migrated), and the data storage device 130 may comprise a destination volume 132B (e.g., providing a destination for the migrated data). In this embodiment, for example, the data storage device 128 may be a storage server or storage system that is being replaced by a newer model, and data stored on the source volume 132A can be migrated (e.g., copied or transferred) to the destination volume 132B. As provided herein, efficient data migration can be facilitated by implementing a data migration component 134, such as an intermediate server, for example, as well as concurrently transferring different slices of the data, if possible.

FIG. 2 is an illustrative example of a data storage system 200, providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including data (D) and/or parity (P) information.

The node 202 comprises one or more processors 204, a memory 206, a network adapter 210, a cluster access adapter 212, and a storage adapter 214 interconnected by a system bus 236. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in array.

The operating system 208 can also manage communications for the data storage system, and communications between other data storage systems that may be in a clustered network, such as attached to a cluster fabric 215 (e.g., 106 in FIG. 1). Thus, the host 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to maintain relationships and data schedules between a source volume, a migration appliance, and a destination volume during data migration as discussed below.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can includes input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 236 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, such as data (D) and/or parity (P), whereas the directory may be implemented as a specially formatted file in which other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical memory whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical memory locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238, may be characterized as constituting a virtual disk or drive upon which data within the virtual volume is stored within the aggregate. For example, LUNs are often referred to as virtual hard drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent each volume stored on a data storage device, a target address on the data storage device can be used to identify one or more LUNs 238. Thus, for example, when the host 202 connects to a volume 224, 226 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 224 by using one or more addresses that identify the LUNs 238.

In one aspect, an administrator of a data storage and management system, such as illustrated by the exemplary environment 100, may wish to add a data storage device, such as 130 in FIG. 1, for example, in order to upgrade the system, and/or replace an older device. In this aspect, in one embodiment, block-level data migration can be performed from the old device (e.g., source volume) to the new device (e.g., destination volume). In one embodiment of data migration, one or more volumes can act as a source volume and one or more volumes can act as a destination volume, wherein data at the source volume is replicated (e.g., full duplication, copy or transfer) at the destination volume.

Figure 3:
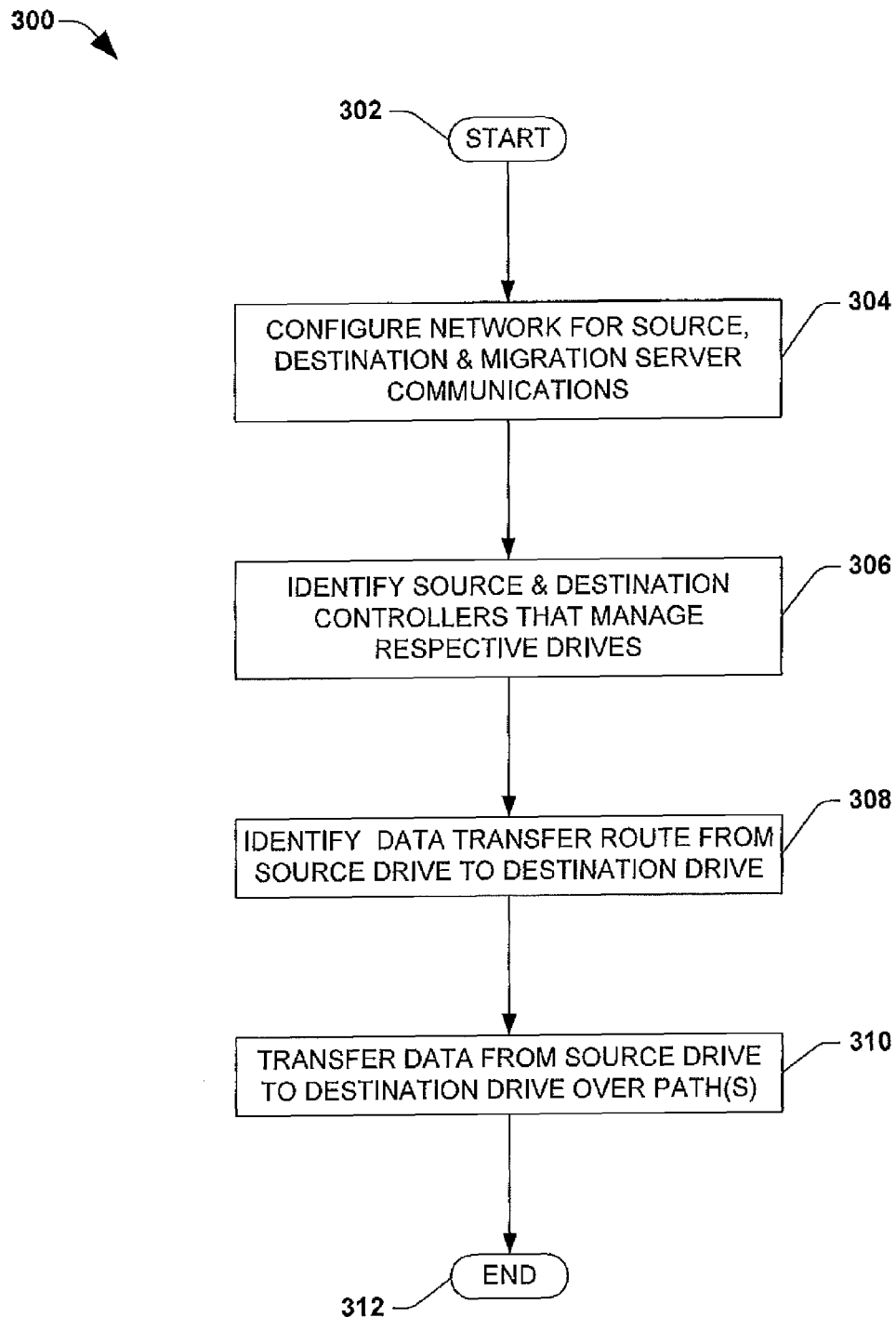
FIG. 3 is a flow chart diagram illustrating an example method for providing improved speed when transferring data from a source data storage device to a destination data storage device in accordance with one or more of the provisions set forth herein.

FIG. 3 is a flow diagram illustrating an example method 300 for transferring data from a source data storage device to a destination data storage device in a data storage network, where the data may be transferred at an enhanced rate relative to known techniques. It will be appreciated that while this method 300 (as well as any other methods described herein) is illustrated and described as a series of acts or events, the present disclosure is not necessarily limited by the illustrated ordering of such acts or events. For example, some acts may occur in different orders and/or concurrently with other acts or events apart from those illustrated and/or described herein. In addition, not all illustrated acts may be required and other non-illustrated acts may be inserted. Further, one or more of the acts depicted herein may be carried out in one or more separate acts or phases.

The exemplary method 300 begins at 302 and involves configuring a data storage network so that a source data storage device (e.g., 128 of FIG. 1), a destination data storage device (e.g., 130 of FIG. 1) and a migration server (e.g., 134 of FIG. 1), can communicate with one another, at 304. In one embodiment, a migration server may be a general purpose computer that comprises an operating system with one or more applications for facilitating the migration of the data from the source to the destination running on top of the operating system.

The migration server can be configured for communications, for example, by being physically plugged into a fabric, such as the cluster fabric 106 (e.g., the migration server 134 of FIG. 1 can be plugged into a storage area network SAN)) of FIG. 1, where the migration server is visible to the network (e.g., the source and destination devices can link to the migration server to communicate). As an example, the migration server may become visible to the storage network when a fabric controller detects it being plugged into the fabric, and determines its identity by information transmitted from the migration server at the time it is plugged in. Further, in one embodiment, the cluster network can be zoned (e.g., in a SAN configuration) where zoning can isolate connected nodes (and the migration server) so that they can communicate with each other. As an example, the numbers that identify the network adapters in the migration server and the source and destination storage devices (e.g., as in 210 of FIG. 2), such as host bus adapter world wide port numbers (HBA WWPN) can be zoned together in the storage network so that they can communicate.

In one embodiment, after configuring the data storage device at 304, for example, a data storage drive from the source data storage device can be mapped to the migration server, and a data storage drive can be mapped from the destination data storage device to the migration server. In one embodiment, a data storage drive may comprise a LUN (e.g., emulated as a virtual hard drive). As described above, LUNs can identify disparate memory locations comprising data that is logically aggregated (e.g., belongs in a same data set, such as a data that is associated with a database). As such, the LUNs can identify a virtual data storage unit (emulated as a drive) within a volume (e.g., a subset of a virtual volume).

In this embodiment, an administrator, for example, can map a first LUN (or a first set of a plurality of LUNS) from the source drive to the migration server, and a second LUN (or a second set of a plurality of LUNS) from the destination drive to the migration server. In one embodiment, mapping drives can comprise presenting the drive (or plurality of drives, such as LUNs) to a host bus adapter (HBA), such as a network adapter 210 from FIG. 2, for example, by presenting the drive number (e.g., LUN). In this way, in this example, the migration server can identify and locate the drive (e.g., LUN). For example, the migration server can identify LUNs by looking at a combination of their LUN number (LUN ID), LUN serial numbers, and various other storage system identifiers (e.g., storage make, model, revision, which world-wide port name and number (wwpn and wwnn) for a given LUN.

At 306 in the example method 300, a controller coupled to the data storage network that manages the source data storage drive and a controller that manages the destination data storage drive are identified using the migration server. In one example, these controllers are identified in a native mode or without the use of third party assistance. That is, the data storage network controller that manages the source data storage drive is identified natively, for example, by running a set of instructions or tasks using native code (e.g., native to the machine or system), contrasted with running an emulation, such as by using a third-party system or software to accomplish the instructions or tasks. Accordingly, the identification is performed without external support (e.g., by running a third-party path identification software program). For example, one or more low level Small Computer System Interface (SCSI) inquiries can be made natively to the data storage drive (and/or other components) and the response(s) thereto can be examined. Similarly, the data storage network controller that manages the destination data storage drive is identified natively (e.g., without using third party path identification software). It will be appreciated that in known techniques, the services of one or more third party service providers have to be employed to make any such identifications. Accordingly, utilizing one or more of the techniques and/or systems provided herein allow data migration to be performed by a single/stand-alone entity, which may translate into significant savings because the services and/or resources (e.g., man-hours) of multiple parties need not be consumed, rather just that of a lone entity. Moreover, while identifying controllers natively may require multiple SCSI inquiries, for example, to be made, whereas significantly fewer, if any, of such inquiries may need to be made if a third party were consulted, the savings achievable by allowing a single entity to identify the controllers can still significantly offset the cost of such inquiries, at least because third party service providers may charge an engagement fee, among other things, for their services and such fees may be substantial. Further, the two controllers may not be mapped to each other, but merely to the migration server component.

In one embodiment, for example, a controller that manages the data storage drive can be an adapter (e.g., network interface card (NIC), or a host bus adapter (HBA)) that connects the node comprising the drive to other nodes, and/or other components, in a network. Further, in this embodiment, respective controllers may comprise a plurality of ports, such that a plurality of communications paths may be directed to or from the controller using the plurality of ports. For example, controllers may comprise eight or sixteen ports, each of which may be utilized as efficient communication paths (e.g., fast data transfer paths).

For example, as illustrated in the example embodiment of FIG. 2, the cluster access adapter 212 connects the node 202 to the cluster fabric 215, for example, of the clustered data storage and management network. In this example, the LUN 238 is resident on the data storage device 234, which connects to and is managed by the node 202, and its components. Therefore, in this example the controller, such as the cluster access adapter 212, has a preferred path (e.g., fastest for data transfer/communications) to the LUN 238; whereas paths from the LUN 238 to controllers from other nodes in the clustered network are longer (e.g., therefore take a longer time to access and/or retrieve data from the LUN 238). Further, in this example, the cluster access adapter 212 may comprise eight (or more or fewer) ports, any one or more of which may provide an efficient (e.g., fast) path for communications.

At 308 in the example method 300, one or more routes of data transfer are determined, passing through the migration server, from the source data storage drive (e.g., a LUN on the source volume, on the storage device to be replaced) to the destination data storage drive (e.g., a LUN on the destination volume, on the new storage device) through the identified controllers (e.g., the controllers managing the drives, which are therefore fastest for the drives), and using the one or more ports for the respective controllers. In this embodiment, determining the route(s) of data transfer can provide one or more efficient priority communications paths for the source and destination data storage drives, for example, as the controllers (e.g., and associated ports) that manage the data storage drives (e.g., LUNS) are typically fastest for the drives (e.g., provide a faster data path for communications, often due to proximity and/or connectivity).

In one embodiment, a plurality of source data storage drives can be mapped to a plurality of destination data storage drives. For example, an administrator may select fifty LUNs to be mapped from the source drive to fifty available LUNs in the destination drive, which can comprise a transfer session (e.g., a unit of data transfer that can be completed prior to beginning another session). In this example, for each of the fifty LUNs, one or more efficient data communications paths are chosen utilizing the controller with the 'fastest path' to the LUN, and the associated ports. In one embodiment, path selection can be done twice for the respective transfers, once for source LUN, once to the destination LUN.

In one embodiment, determining a route between drives can comprise identifying a desired route between the source and destination controllers, where an administrator of the data migration, for example, will often desire a shortest route to facilitate enhanced transfer speed. For example, the source and destination controllers can be attached (e.g., physically connected/plugged-in via a hard wire from a port on the adapter to the network fabric, such as a switch, router, or some component specifically designed to connect components to the network) to the storage network, and an administrator can identify the network path through the storage fabric/network (e.g., a SAN built as a 'fabric'), for example, between the two adapters. In this embodiment, for example, the data transfer from the source drive to the destination drive will utilize a shortest, and/or a quickest, path.

At 310, after one or more efficient priority communication paths are determined, the data can be transferred from the source data storage drive to the destination data storage drive concurrently using two or more efficient data communications paths, if two or more paths are available. For example, a transfer session can comprise data transfer between a plurality of source and destination drives (e.g., LUNs) and/or a single source and destination drive where the data can be broken up into different pieces or slices that can be transferred concurrently. In this example, an administrator, or an automated function, can initiate the transfer session, where the session begins by transferring data from a first source drive to a first destination drive listed in the transfer session. Further, data from a second source drive can be transferred to a second destination drive substantially concurrently where the storage network and source and destination storage devices have appropriate bandwidth to accommodate the multiple concurrent transfers. Similarly, multiple (different) slices of data from a source drive can be concurrently transferred to a destination drive where a plurality of data communications paths have been identified, such as using a plurality of ports on identified controllers. It will be appreciated that this concurrent data transfer can also be adjusted in real time or on the fly by monitoring the utilization of the storage ports and either increasing or decreasing the number of concurrent data transfers based upon their available capacity to transfer data. For example, ports can continually (or at predetermined intervals) be monitored (e.g., tested) to determine one or more of their performance characteristics (e.g., stability, data rate, etc.) and thus be designated as usable or not. For example, a usable or "open" port may be one that is suitable in that it meets predefined criteria that facilitate data transfer at a predefined rate. Moreover, characteristics of the slices of data can likewise be adjusted in real time to facilitate faster overall data transfer. For example, data slices can be made larger where underutilized ports are identified (e.g., one or more ports return characteristic values indicating that the ports have the bandwidth or can otherwise accommodate more data), whereas the number (or respective sizes) of data slices can be reduced on ports which have a high degree of utilization (e.g., one or more ports return characteristic values indicating that the ports do not have available bandwidth or can not otherwise accommodate (more) data). The number (or respective sizes) of slices active can be adjusted in real time to more fully utilize the particular data paths that are available at any moment. Further, where different available data paths have different characteristics, different slices having different respective characteristics can be transferred concurrently on the different paths. For example, a larger number of slices (or size of respective slices) can be prepared and transferred where an under-utilized port is identified and a smaller number of slices (or size of respective slices) can be concurrently prepared and transferred through a port with a high level of utilization at substantially the same point in time. In this manner, efficient data transfer may be achieved because the amount of data that is being transferred at any instant is generally the largest sum total of data that can be transferred given the available resources and/or infrastructure.

Having transferred the data from the source drive to the destination drive, the example method 300 ends at 312.

Figure 4:
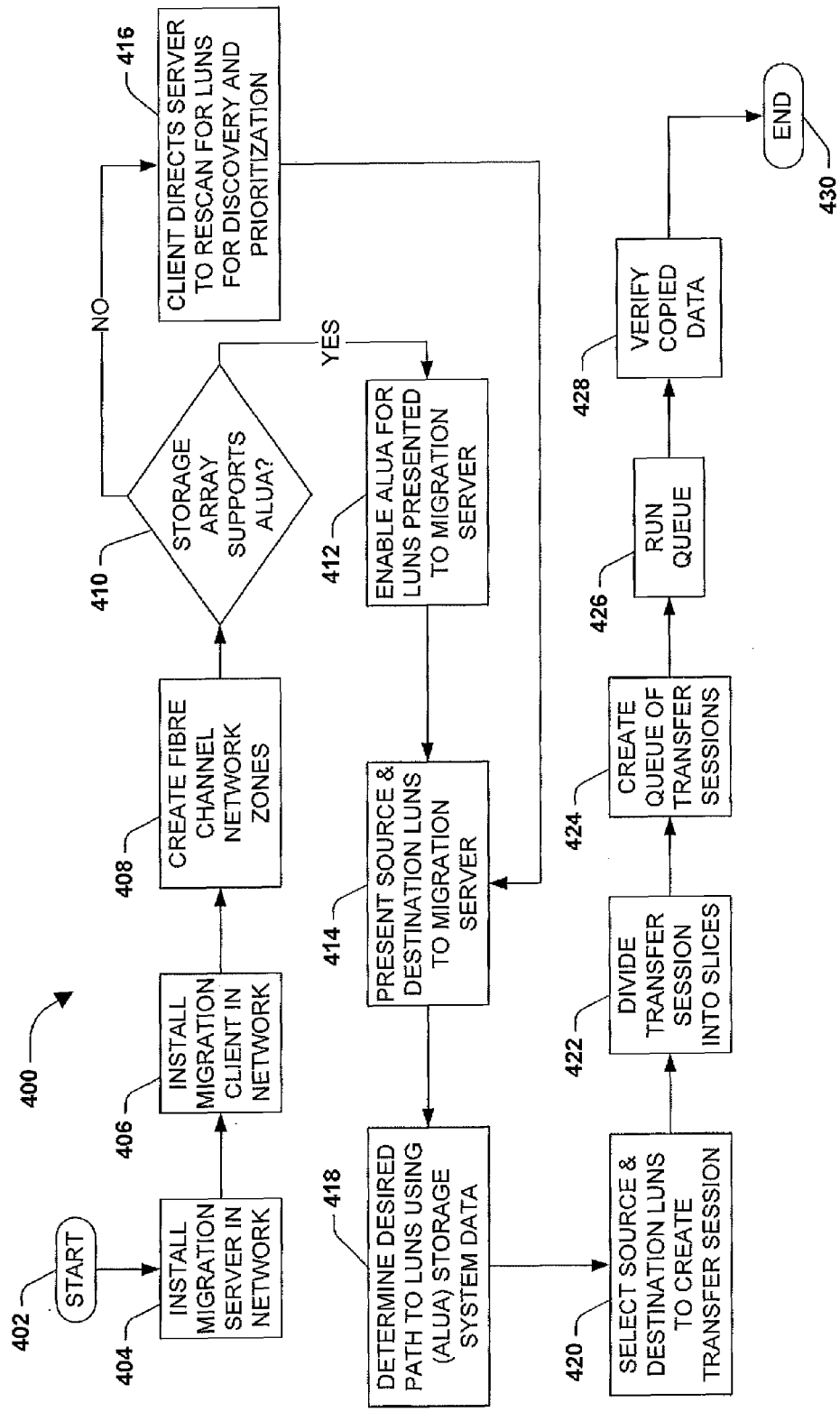
FIG. 4 is a flow chart diagram illustrating an example method for data migration in accordance with one or more of the provisions set forth herein.

FIG. 4 is a flow diagram illustrating an example embodiment 400 of an implementation of one or more of the methods described herein. The example embodiment 400 begins at 402 when a migration server is installed on a data storage network, such as the clustered network environment 100 of FIG. 1, at 404. In one embodiment, the migration server can be a general purpose computer, or it can be a special purpose computing device configured for migrating data, which facilitates the migration of data from source volume to a destination volume.

The migration server can be physically connected to the storage network (e.g., the storage fabric 106 of FIG. 1), for example, by connecting a hard wire from a storage adapter in the migration server to a network component (e.g., a switch) attached to the storage fabric. As an example, the storage network may comprise a Fibre Channel switched fabric topology (FC-SW), where components are connected to each other through one or more switches. A plurality of switches in a fabric can form a clustered network, with components/devices connected within the cluster. Further, as an example, a connection can comprise a Fibre-Channel host bus adapter (HBA) or iSCSI adapter to connect to the storage network.

At 406, a migration client is installed on the network. As an example, a migration client can be a general purpose computer on which resides an operating system and one or more applications that allow an administrator of the data migration to interact with the migration process (e.g., view information using a user interface (UI), enter commands, etc.), for example, by sending commands to the migration server. In one embodiment, the client computer can be attached to the network using an Ethernet connection to a local area network (LAN), for example, which forms a portion of the clustered network (e.g., a LAN can be created for a series of nodes located in a same area, which can be attached to the cluster fabric to form a larger clustered environment with other LANs comprising nodes in other locations). It will be appreciated that the migration server and migration client can be attached to the network (e.g., through an attached Ethernet network) at locations remotely from each other, or at a same location in the network.

In one embodiment, a client computer attached to the Ethernet network can be used to map the source data storage drive and the destination data storage drive visible to the migration server, which is attached to the storage network. Further, the client computer can be used to request information from the migration server about the one or more data storage drives (e.g., LUNs), which are located on the source and destination volumes, for example. Additionally, the client computer can be used to map the route of data transfer, for example, through the controllers identified as managing the source and destination drives.

At 408, in the example embodiment 400, Fibre Channel (FC) access zones are created. As described above, zoning of the network can be performed so that the migration server, source storage devices, and destination storage devices can communicate with each other. As an example, storage area networks (SAN) typically utilize reliable and fault tolerant storage, mitigating a single point failure, by having multiple paths from host to storage. In this example, where a plurality of hosts (nodes) may comprise different types (e.g., heterogeneous), and comprise different operating systems, zoning allows an administrator to limit communications between network components and devices by zoning the devices and paths, often to mitigate interference, for data security purposes, and/or to simplify management.

In one embodiment, zones can be created by placing physical ports on a switch into a zone, and attaching the desired devices to that switch. In another embodiment, zones can be created by utilizing a World Wide Port Number or Name (WWPN) for a device's port, and restricting specific switches or ports from seeing a particular port. In this way, for example, the migration server, and source and destination storage devices can be placed in the same zone to mitigate interference from other network activity, and to simplify management of the data migration.

At 410, a determination is made as to whether the storage arrays that comprise the one or more source and destination drives support asynchronous LUN access (ALUA). If so, ALUA can be enabled at 412 for the LUNs involved in the migration which were presented to the migration server. ALUA is an industry-wide standard defined in SCSI Primary Commands (SPC) 3 and 4 (SPC-3 and SPC-4) documents drafted by a Technical Committee of the InterNational Committee on Information Technology Standards (INCITS). ALUA is a multipathing technology for asymmetrical network storage arrays, where, if the storage array supports ALUA, path configuration by the host is mitigated. An asymmetrical storage array provides different levels of access per port, such as in the clustered network described in FIG. 1. As an example, an asymmetrical storage array with two controllers can have LUN paths to a first controller port as active and optimized, while having LUN paths to a second controller port as active and non-optimized. In this example, utilizing ALUA, the host node can recognize a fastest path to the first controller port from the LUN, thereby utilizing it as a primary path.

After 412, one or more source LUNs and destination LUNs are presented to the migration server. For example, using the client computer, the migration administrator can identify which LUNs on the source volume are to be transferred to the destination volume, and then identify which destination LUNs will be used for the transferred data. These LUNs, a set from the source and an equivalent set of LUNs from the destination, can be made visible (e.g., mapped) to the migration server, and are identifiable on the migration server by various unique attributes (e.g., comprising the adapter number, port number, volume number, LUN ID, and LUN serial number) on the migration server. As an example, the storage administrator can map fifty LUNs from the source volume to the migration server, and fifty LUNs from the destinations server to the migration server. In this way, in this example, the migration server knows which LUNs are involved in the data transfer.

If ALUA is not supported at 410, the client directs the migration server to rescan for LUNs at 416 for discovery and prioritization of the LUNs in the data migration. In one embodiment, an application running on the migration client can automatically call to the migration server to perform the LUN discovery and prioritization process. In another embodiment, an administrator may use the migration client to make a call to the migration server to perform the LUN discovery and prioritization process.

In one embodiment, rescanning for discovery and prioritization of the LUNs can comprise sending one or more queries from the migration server to a data storage drive (e.g., one of the LUNs involved in the data migration) over a plurality of communications paths, to identify the controllers that manage the LUNs. For example, the migration server can query a source LUN for path priority, where there may be eight paths to the LUN from the migration server through the clustered network (e.g., there may be more than one controller that links to the LUN, and or more than one port per controller). In this example, one of the controllers manages the LUN directly, as described above, and the managing controller (e.g., the controller that "owns" the LUN) can be identified. In another embodiment, a time for returning responses from the queries may be determined, and a path having a desired (e.g., fastest) response time can be identified as the one having the managing controller. Further, in this embodiment, the number of ports that are available for LUN data transfer can be identified, such as those that are active and usable to a desired degree (e.g., exhibit desired data transfer characteristics, have adequate available capacity, etc.).

In this example, the migration server can query the respective LUNs that were presented to the server at 414 (e.g., fifty source LUNs and fifty destination LUNs) to identify the path priority for the respective LUNs, where a desired path (e.g., an optimal path having a fastest communications time) for the respective LUNs can be determined by using storage system data. Further, in one embodiment, the migration server discovery and prioritization process can comprise sending queries to the LUNs to identify a size of the respective LUNs along with identifying their locations. In another embodiment, the system can support more than just ALUA for path selection, such as Redundant Disk Array Controller (RDAC), native path selection, etc.

In this embodiment, a list of the LUNs and the corresponding information (e.g., path priority, size and location) can be presented back to the migration client. At 420, the migration client can be used to select a source LUN from which data will be migrated, and a corresponding destination LUN to which data will be migrated, in order to map a route of data transfer (or a plurality of routes of data transfer using multiple ports on respective controllers) from the source data storage drive (source LUN) to the destination data storage drive (destination LUN). In one embodiment, the migration client may utilize an application that automatically (e.g., programmatically) selects source and destination data storage drive for mapping a route. In another embodiment, an administrator may select the source and destination data storage drives, such as from a list provided by the migration server.

In one embodiment, once the source and destination data storage drives are selected, the migration server can automatically (e.g., programmatically) provide a preferred route of data transfer (e.g., or a plurality of preferred routes of data transfer that meet a predefined transfer speed criteria) using the identified controllers for the source data storage drive (e.g., LUN) and the destination data storage drive, for example, from storage system data. In one embodiment, a data transfer session can be automatically saved to memory residing in the migration server after a map of the route of data transfer is identified, for example, where a data transfer session can comprise one route of data transfer between LUNs or routes of data transfers for a plurality of paired LUNs. It will be appreciated that automatically performing a function or task can refer, for example, to a system component and/or computer program that is configured to perform or undertake tasks without additional input from an administrator or user. For example, an action can be initiated automatically based upon the occurrence of some non-user initiated triggering event(s), such as passage of a (predetermined) period of time, establishment of a particular configuration (e.g., connection of source and destination drives), etc. As another example, automatic can mean that once a task or function is put in motion (started) the task or function is completed without additional input and/or interaction from an outside source, such as a user.

At 422 of the example method 400, once the one or more transfer sessions have been created, the respective transfer sessions are divided into subsets (slices) of the transfer session, where a transfer session can be divided into two or more slices. For example, a transfer session may comprise ten gigabytes of data that is to be migrated from the source drive to the destination drive. In this example, the transfer session may be divided into five, two gigabyte slices (or any other sized subset). In one embodiment, the client computer attached to the data storage network can be used to define the subset of the data contents of the source data storage drive, for example, using an application residing on the client, or by an administrator selecting subset sizes and/or number per session. Moreover, the size and/or other characteristics of the slices can be adjusted on the fly based on how usable, for example, one or more communication ports are determined to be. For example, if one port is found to be under-utilized to a great degree, then a relatively larger number of slices (and/or slices having relatively larger respective sizes) can be generated and allocated to that port, while a relatively smaller number of slices (and/or slices having relatively smaller respective sizes) can be generated and allocated to another port that is found to be open to lesser degree (e.g., utilized to a greater degree). These different slices can then be transferred concurrently using the different respective ports to increase the overall efficiency of the transfer session.

At 424, the one or more transfer sessions are put into a queue. In one embodiment, where the transfer sessions (e.g., the information necessary to migrate data from a source LUN to a destination LUN, such as locations, controller identifications, and priority paths) have been saved to the migration server's memory, the migration serve may create a queue comprising the respective transfer sessions, for example, based on size, first-in-first-out, or some other criteria. In one embodiment, a plurality of queues may be created in preparation for the data transfer at some later time, for example, or for concurrent data transfers over a plurality of preferred paths.

At 426, a queue, comprising one or more transfer session, is run. In one embodiment, the running of the queue can be initiated from the migration client by an application, or by an administrator. In another embodiment, queue may be initiated from the migration server once the queue is created. Initiating the queue comprises initiating a first transfer session in the queue, which begins a transfer of data (e.g. copying the data) from the source data storage drive to the destination data storage drive from the first transfer session in the queue.

Once a queue is initiated to run, the respective transfer sessions in the queue are run. In one embodiment, a first data transfer session from the queue is completed prior to initiating a second data transfer session from the queue. That is, the transfer sessions in the queue are run in sequence. Alternatively, transfer sessions may be run concurrently, for example, where a level of concurrency in the queue can be configurable using an automated process, and/or using input from a client. In this embodiment, as an example, a plurality of preferred data paths may be utilized to parallelize the data transfer, such as by using multiple ports on the respective controllers. In another embodiment, initiating the transfer sessions in the queue may be influenced by other parameters, such as network bandwidth, resource availability, and/or administrator preferences, for example.

In one embodiment, the migration server memory can be used to transfer the data from the source data storage drive to the destination data storage drive. In this embodiment, the first subset of the data contents (e.g., slice of the transfer session) of the source drive can be copied to the migration server memory. Subsequently, the first subset of the data contents of the source data storage drive can be copied from the migration server memory to the destination data storage drive. Further, in this embodiment, once the first subset of the data contents of the source drive is copied from the memory to the destination drive, a second subset of the data contents of the source drive can be copied from the source drive to the migration server memory. In another embodiment, the data may be copied directly from the source drive to the destination drive, using the mapped data transfer routes between the drives.

Transferring data from a source drive to a destination drive can be performed on a block-level. That is, data is copied byte by byte from the source drive to the destination drive, at the memory block-level (e.g., data is stored in blocks of memory identified by memory addresses on the drives). In one embodiment, transferring the data from the source data storage drive to the destination data storage drive can comprise transferring a first subset of (slice) data contents of the source data storage drive from the source data storage drive to the destination data storage drive prior to transferring a second subset of the data contents of the source data storage drive from the source data storage drive to destination data storage drive. That is, merely one slice of the transfer session, comprising a particular amount of data blocks, is copied prior to another slice of the transfer session being copied. In this way, for example, if a data copy error occurs during the transfer, merely one slice of data may need to be recopied instead of an entire transfer session worth of data. In this example, when a copy error occurs, loss of valuable time and resources can be mitigated when less data transfer is lost and thus has to be recopied.

At 428 in the example method 400, to determine if copy errors are present, data on the destination drive, which was copied from the source drive, can be compared with the data on the source drive, which was copied to the destination storage drive. That is, once the data is copied to the destination drive it can be compared with the original data located on the source drive. In this way, for example, if the comparison reveals differences in the two sets of data, a copy error may have occurred during the transfer. In one embodiment, a verification queue may be used, for example, where verification jobs are run from a front of the queue in and added to a back of the queue as copying is performed.

In one embodiment, at least a portion of the data from the source drive can be transferred to migration server memory, and a same portion of the data from the destination data storage drive can be transferred to migration server memory, then the data in the migration server memory from the source drive can be compared with the data in the migration server memory from the destination storage drive to determine if copy errors are present. That is, the data transferred from the source drive to the destination drive can be compared in the migration server memory, by sending portions of the transferred data to the migration server memory.

In one embodiment, the data can be compared after the data contents of the source drive (e.g., all of the data in the transfer session, or the queue, or the LUN) are copied to the destination data storage drive. In another embodiment, the data can be compared after a subset of the data contents of the source data storage drive (e.g., a slice of the transfer session) is copied to the destination data storage drive. In yet another embodiment, the data can be compared during the transferring of the data contents of the source data storage drive to the destination data storage drive.

Having transferred the data from the source drive to the destination drive, and checked the data for copy errors, the example embodiment 400 ends at 430.

Figure 5:
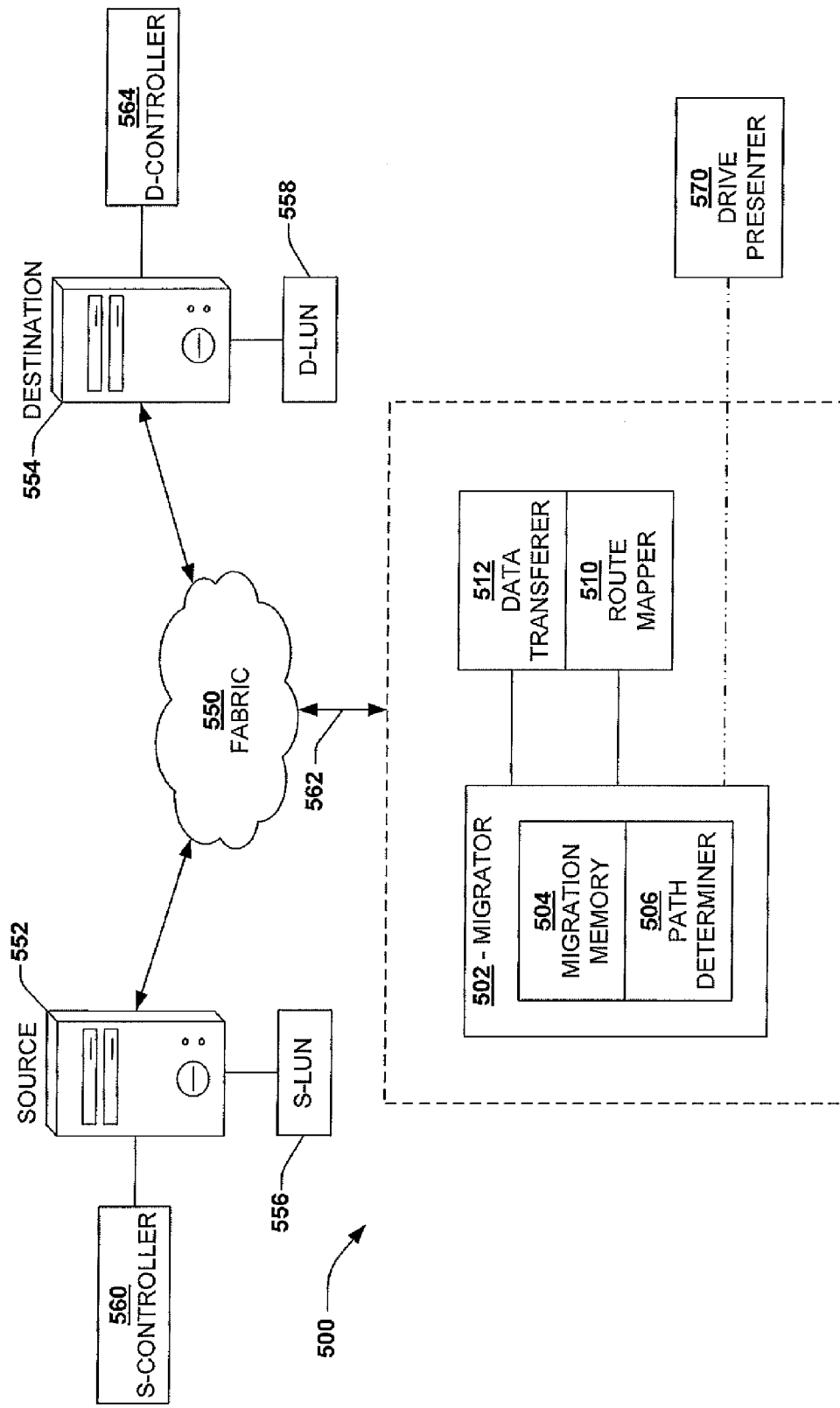
FIG. 5 is a component block diagram illustrating an example system configured to provide improved speed when transferring data from a source data storage device to a destination data storage device in accordance with one or more of the provisions set forth herein.

A system may be devised that provides for improved speed when transferring data from a source data storage device to a destination data storage device in a data storage network, as illustrated by the component block diagram of an example system 500, in FIG. 5. In the example system 500, a migration component 502 is operably coupled 562 (e.g., by plugging a hard wire into a switch in the network fabric, such as the cluster fabric 550) with the data storage network (not illustrated) so it can communicate with the source data storage device 552 and destination data storage device 554 over the data storage network. For example, by connecting to the network, the migration component 502 can use the cluster network fabric 550 for facilitating transfer of data from the source data storage device 552 to the destination data storage device 554.

In the example system 500, the migration component 502 comprises migration memory 504 that stores at least a portion of the data that is transferred from the source data storage device 552 to the destination data storage device 554. For example, during data migration data can be transferred from a source LUN 556 to the migration memory 504, and then transferred from the migration memory 504 to the destination LUN 558. As another example, after data is migrated from the source LUN 556 to the destination LUN 558 a copy of the data that was transferred can be sent to the migration memory 504 from the source LUN 556 and from the destination LUN 558 to the migration memory 504, so that the two sets of data can be compared for data copy errors.

Further, the migration component 502 comprises a priority communications path determination component 506 that natively (e.g., without emulation support from a third-party program or system) identifies controllers, such as 560 and 564, coupled to the data storage network that manage the source and destination data storage drives 556 and 558 respectively. In one example, the priority communications path determination component 506 is self-sufficient in identifying the controllers. That is, the priority communications path determination component 506 natively identifies the controllers on its own, without emulation support from a third party program and/or system. Further, the source and destination data storage drives may be mapped to the migration component, but not to each other. For example, where the source and destination data storage drives are mapped to the migration component, but not to each other. For example, a pseudo-drive (e.g., a virtual storage unit that comprise disparate memory blocks emulated as a single memory drive), such as a LUN, is managed directly by a controller associated with the data storage device (e.g., 552) which comprises the storage volume that comprises the pseudo drive.

Further, in this example, in a clustered network storage system, the various pseudo-drives can be accessed using controllers (e.g., 560, 564) on other data storage devices attached to the network. In this embodiment, the priority communications path determination component 506, for example, can identify the controller (e.g., and associated ports (not shown)) that directly manages the respective pseudo-drives from the other controllers that may merely have access to a pseudo-drive.

In one embodiment the exemplary system may comprise a data storage drive presenting component 570 that presents data storage drives (e.g., 556) from the source data storage device 552 and data storage drives (e.g., 558) from the destination data storage device 554 to the migration component 502 so that appropriate data transfer locations can be identified by the migration component 502. For example, in order for the migration component 502 to be able to facilitate a transfer of source data from the source LUN 556 to the destination LUN 558 the data storage drive presenting component 570 can present the drive locations (e.g., memory locations in the clustered network and/or identities (e.g., unique number identifications associated with the drives)) to the migration component 502. In this embodiment, the data storage drive presenting component 570 can be operably coupled with the migration component 502, and in another embodiment, can be operably coupled 562 with the cluster fabric 550 of the clustered storage network.

In the example system 500, a data transfer mapping component 510 determines one or more routes of data transfer (efficient priority communications paths) from the source data storage drive 556 to the destination data storage drive 558 through the identified controllers, using one or more ports on the respective controllers, such as the source drive controller 560 and the destination drive controller 564, which were identified by the priority communications path determination component 506. The migration component 502 can use one or more of the mapped routes of data transfer to facilitate transfer of data from the source data storage device 556 to the destination data storage device 558, for example, which are desired (e.g., optimal) paths for improved transfer speed. In this example system 500, the data transfer mapping component 510 is operably coupled with the migration component 502 and, for example, can also be operably coupled 562 with the cluster fabric 550 to determine a plurality of data paths.

In one embodiment the system may comprise a data transferring component 512 operably coupled with the migration component 502 and configured to initiate concurrent transferring of the data from the source data storage drive 556 to the destination data storage drive 558 using the migration component 502 over two or more efficient priority communications paths, if two or more paths are available. In one embodiment, the data transferring component 512 can signal the migration component 502 to begin transferring the data using one or more of the preferred routes of data transfer identified by the route mapper 510. For example, the contents of the source LUN 556 can be transferred via the source controller 560, through the storage fabric 550, to the destination LUN 558, through the destination controller 564, at the initiation of the data transfer component 512. Further, in one embodiment, the data can be divided into subsets, and the subsets can be concurrently transferred from the source to the destination drives (e.g., 556, 558) using a plurality of paths that utilize a plurality of ports on the respective controllers (e.g., 560, 564).

Figure 6:
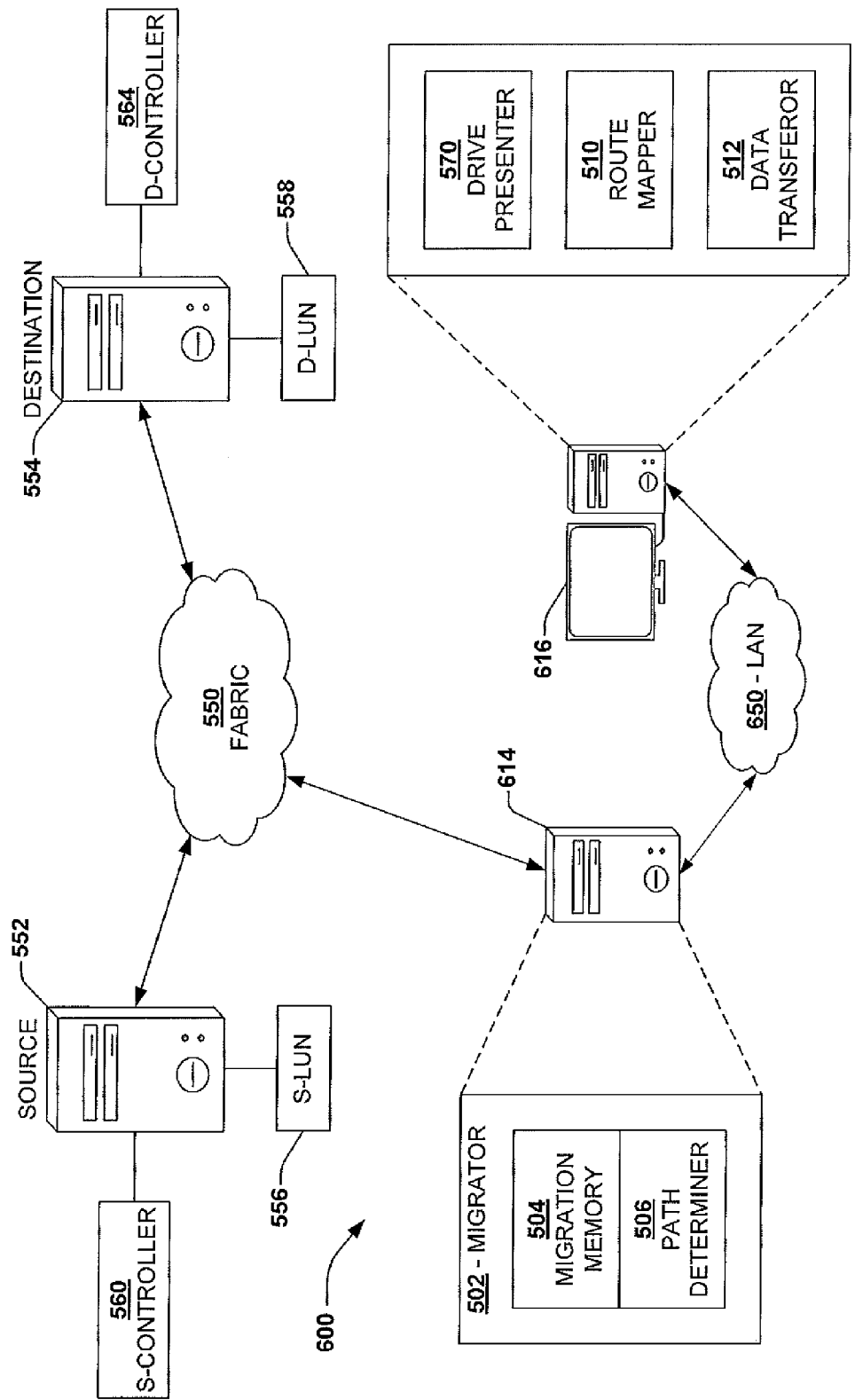
FIG. 6 is component block diagram illustrating an example system configured to facilitate data migration in accordance with one or more of the provisions set forth herein.

FIG. 6 is one example embodiment 600 of a system configured to facilitate enhanced data transfer as provided herein. In this embodiment 600, one or more of the components discussed with regard to FIG. 5 are again presented, although other embodiments are possible and contemplated. In the illustrated example, the data storage drive presenting component 570, the route of data transfer mapping component 510, and the data transferring component 512 reside on a client computing device 616, such as a general purpose computer. As one example, the client 616 may merely implement a user interface that accesses these components, such that the instantiation of the component can be present elsewhere (e.g., the migration server, and/or the storage device) and the client 616 utilizes their functionality.

In this embodiment, the client computer 616 is coupled with the migration component 502 using an Ethernet connection to a LAN 650 utilized by one of the data storage nodes making up the clustered network. In this way, for example, the client 616 can be attached at any location (e.g., respective nodes may be located remotely from each other in the network), while the migration component 502 can be attached at another location (e.g., remotely from the client 616). Further, in this embodiment, the client 616 can provide an interface to the migration component 502, which may allow an administrator, for example, to manage queues, transfer sessions, server configurations, etc. It will be appreciated that a plurality of client computers (e.g., 616) can be connected with the migration component (e.g., 502) in such a way as to provide a plurality of data transfer sessions in parallel, for example.

Figure 7:
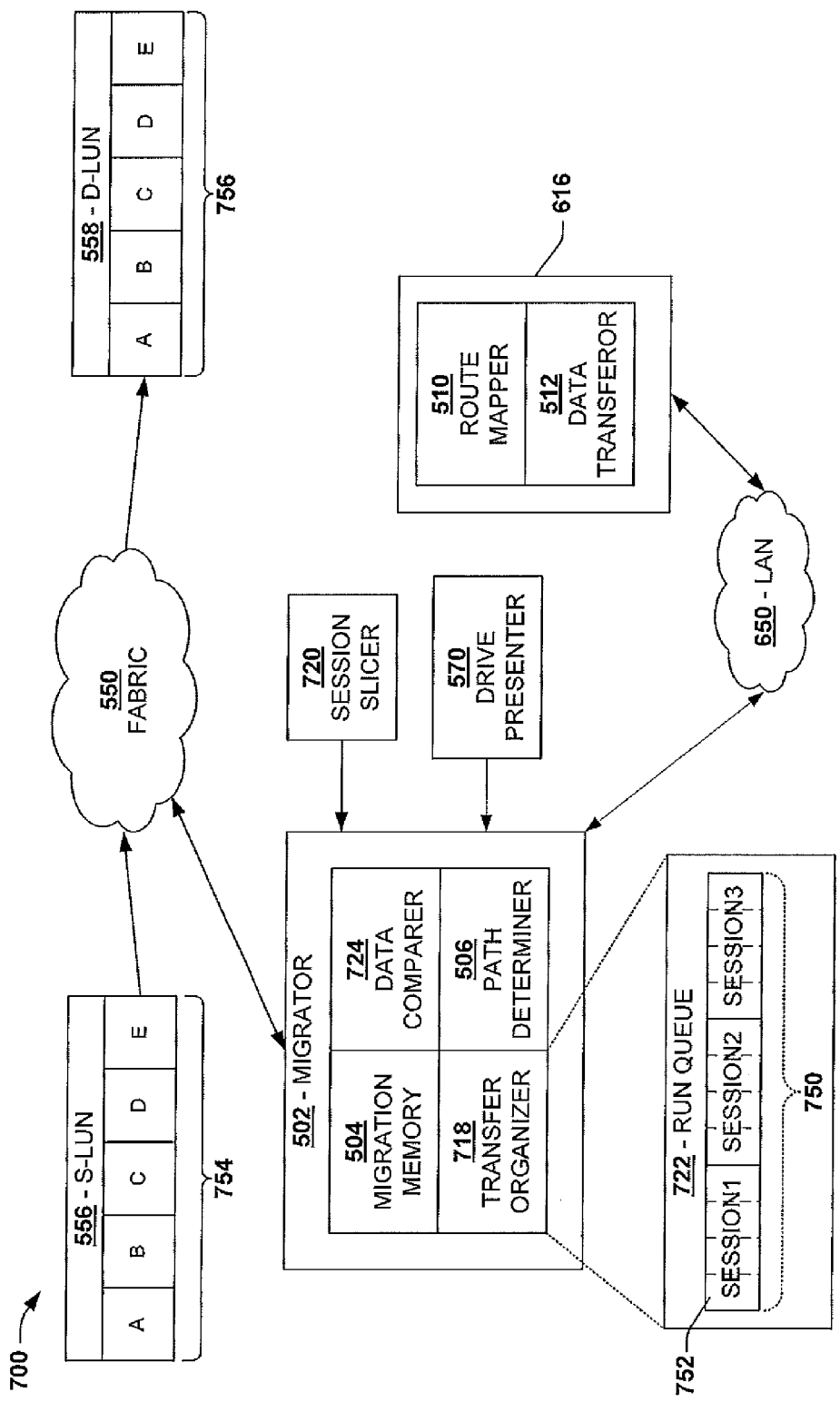
FIG. 7 is component block diagram illustrating an example system configured to facilitate data migration in accordance with one or more of the provisions set forth herein.

FIG. 7 is another example embodiment 700 of a system configured to facilitate enhanced data transfer as provided herein. As with FIG. 6, in this embodiment 700, one or more of the components discussed with regard to FIG. 5 are again presented, although other embodiments are possible and contemplated. A source LUN 556 and a destination LUN 558 are attached to the network over the storage network 550 (e.g., at respective source and destination nodes), the migration component 502 (e.g., a special purpose migration server) is attached to the storage network 550, and a client computer 616 is attached to an Ethernet network 650 (e.g., by connecting to a LAN using an Ethernet connection, not connected to the storage network). In this embodiment 700, as an example, the respective LUNs 556 and 558 are comprised of data blocks 754 and 756. In this example, contents of the source data blocks 754 will be transferred to the destination data blocks 756.

In this embodiment, when the route of data transfer mapping component 510 maps the one or more routes of data transfer from the source data storage drive 556 to the destination data storage drive 558 a data transfer session is created. In one embodiment, the transfer session comprises identified storage locations of data (e.g., 754) on the source data storage drive 556 to be copied to the destination storage locations (e.g., 756) on the destination data storage drive 558. As an example, upon mapping the route, a transfer session can be created and stored in the migration memory 504.

Further, in this example embodiment 700, the migration server 502 comprises a transfer session organization component 718, coupled with the migration memory 504, which stores transfer sessions in the migration memory 504. As an example, when a transfer session is created, as described above, it can be stored to the migration memory 504, and as more and more transfer sessions are created by mapping respective source LUNs (e.g., 556) to destination LUNs (e.g., 558) the transfer sessions can be stored to the migration memory 504.

In one embodiment, the respective transfer session 750 can be organized in a run queue 722 by the transfer session organization component 718, for example, such that as a new session is created it can be placed at in the run queue. In one embodiment, the transfer session organization component 718 may organize the sessions 750 based on some specified criteria (e.g., specified by an administrator and/or an automated application process, such as by importance of data), such that the sessions are prioritized for being run based on the criteria. In this embodiment, the data transferring component 512 can initiate transferring of the data from the source data storage drive (e.g., 556) to the destination data storage drive (e.g., 558) from the one or more transfer sessions 750 in run queue 722. In one embodiment, after the data has been transferred (e.g., copied) it is moved to a 'verify' queue and verified.

In the example embodiment 700, a transfer session slicing component 720 divides the transfer session 750 into one or more transfer session subsets 752 (slices), where the slices 752 are portions of the identified storage locations of data (e.g., 754) on the source data storage drive (e.g., 556) to be copied to the corresponding destination storage locations (e.g., 756) on the destination data storage drive (e.g., 558). For example, a transfer session may comprise ten gigabytes of data to be migrated from the source to the destination drives. In this example, the session slicer 720 can divide the transfer session into five slices of two gigabytes each. In this way, as an example, merely two gigabytes of block-level data are transferred from the source to the destination at a time, and if the transfer is interrupted for any reason (e.g., power failure, copy error, etc.) a retransfer (e.g., restarting the transfer that was interrupted) comprises merely two gigabytes instead of the ten of the entire session. In this way, in this example, retransfers can save time and computing resources.

In one embodiment, migration component 502 copies a first subset of data (e.g., slice, such as 752) from the source data storage drive (e.g., 556) to the destination data storage drive (e.g., 558) prior to transferring a second subset of the data from the source data storage drive to destination data storage drive. In one embodiment of data transfer, the migration component 502 can copy a first slice 752 from the source data storage drive 556 to migration memory 504, and copy the first slice 752 from the migration server memory 504 to the destination data storage drive 558 prior to transferring a second slice 752. In this way, for example, respective slices 752 of a transfer session 750 can be migrated one at a time in case a transfer error occurs, as described above. Further, after a final slice of a session is migrated, a next session transfer can be run from the queue 722. In another embodiment, the one or more slices can be transferred concurrently, for example, such that two or more of the plurality of data slices can be copied at a same time. In this embodiment, a level of concurrency, such as how many slices are transferred at a same time, can be adjusted.

In the example embodiment 700, the migration component 502 comprises a data comparison component 724 that compares the data on the destination data storage drive (e.g., 756 of 558) that was copied from the source data storage drive 556 with the data on the source data storage drive e.g., 754 of 556) that was copied to the destination storage drive to determine if copy errors are present. For example, the data that was copied to the destination drive still resides in the memory blocks (e.g., 754) of the source LUN 556, this data can be compared with the data located in the memory blocks 756 of the destination LUN 558, which was just copied there, to determine if it is unchanged (e.g., same in source and in destination).

In one embodiment, the data comparison component 724 can copy data (e.g., residing in memory blocks 754) from the source data storage drive (e.g., 556) to migration memory 504, transfer a same portion of the data (e.g., residing in memory blocks 756) from the destination data storage drive (e.g., 558) to migration memory 504, and then compare the data in the migration memory 504 from the source data storage drive 556 with the data in the migration memory 504 from the destination storage drive 558 to determine if copy errors are present. For example, the migration memory collects copies of the data that was transferred from both the source and destinations drives to determine if they are unchanged.

Figure 8:
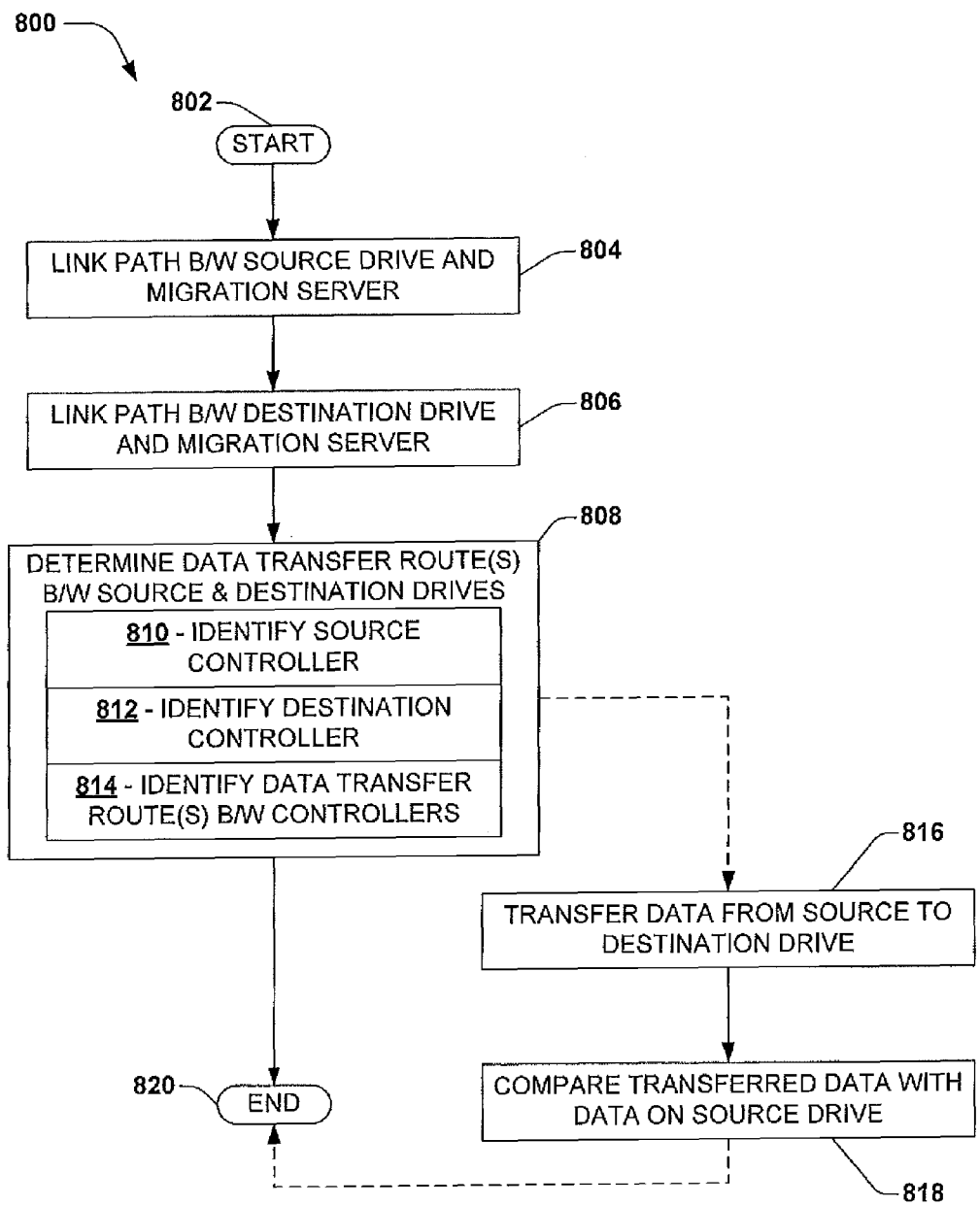
FIG. 8 is a flow chart diagram illustrating an example method for providing improved speed and error detection when transferring data from a source data storage device to a destination data storage device in accordance with one or more of the provisions set forth herein.

An alternate method may be devised for providing improved speed and error detection when transferring data from a source data storage device to a destination data storage device in a data storage network. FIG. 8 is a flow diagram of an example of this alternate method 800. The example method 800 begins at 802 and involves creating a communications path between a source data storage drive residing on a source data storage device and a data migration component on a data storage network, by linking the two over a communications network, at 804. Here, the source data storage drive comprises stored data to be transferred, for example, to a destination storage drive on the communications network, such as a data storage and management clustered network.

At 806, a communications path is created between a destination data storage drive residing on a destination data storage device and the data migration component on the data storage network, by linking the two over the network, where the destination data storage drive comprises data storage locations for the data to be transferred to from the source drive. Therefore, as an example, the source drive is linked with the migration component and the destination drive is linked with the migration component, so that the three components can communicate with each other over the network. In one embodiment, the components can be zoned in a storage area network (SAN), so that merely the three components can communicate without interference from other components in the network.

At 808, one or more preferred data transfer routes are determined between the source data storage drive and the destination data storage drive using the data migration component, where both a source controller and a destination controller are identified natively (e.g., without use of a third-party application for path identification), where the source and destination controllers directly manage the source and destination drives respectively, at 810 and 812. Further, in this embodiment, a plurality of ports may be identified on respective controllers, thereby allowing a plurality of preferred data transfer routes to be identified. As an example, the source controller is coupled with the source drive and the destination controller is coupled with the destination drive where communicating with respective drives comprises communicating through the respective controllers. At 814, one or more preferred data transfer routes can be identified as priority communications paths for data transfer (e.g., between one or more ports on the source controller and one or more ports on the destination controller in the data storage network) between the source and destination data storage drive controller, through the migration component. In this way, for example, the data transfer route(s) can comprise a preferred (e.g., fastest and/or optimized) route(s) for transferring data between the respective drives. Having identified the preferred data transfer route(s), the example method 800 ends at 820.

Alternately, in one embodiment, at 816, data can be transferred from the source data storage drive to the destination data storage drive using the preferred data transfer route(s). For example, where the one or more preferred data transfer routes comprise a link between one or more ports on the identified source controller and one or more ports on the destination controller, respective data transfer routes comprise an optimal route of data transfer for the migration for speed and/or efficiency (e.g., data loss). In one embodiment, the data is transferred byte by byte at a block-level, where a set of source memory blocks is read by a storage drive head, sent to a transient memory location, such as in the migration server, and then the data from the transient memory location is sent to a corresponding set of memory blocks in the destination drive, where storage drive heads write the data.

In this embodiment, at 818, the data transferred to the destination data storage drive can be compared with the data on the source data storage drive to determine if the data is unchanged. For example, data that was copied to the memory blocks in the destination drive can be compared with the data in the source memory blocks from which it came, to determine if any changes to the data occurred during the transfer. In this way, for example, copy errors can be detected, such as where a same data unit from the source and destination drives is different (e.g., a value is different, such one or more of the binary values for an eight-bit block has changed). Having compared the data, this embodiment of the example method 800 ends at 820.

Figure 9:
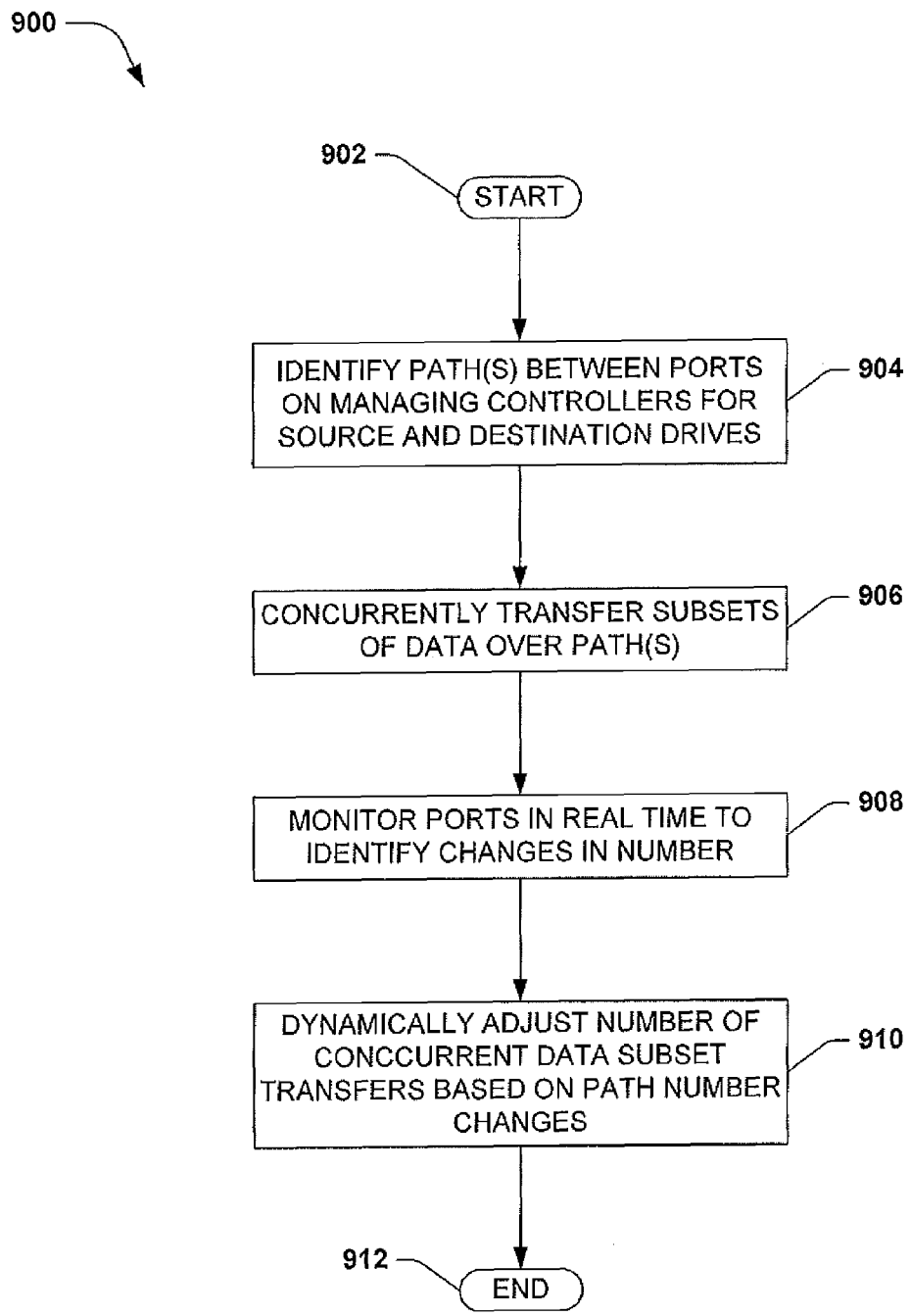
FIG. 9 is a flow chart diagram illustrating an example method for providing improved speed and error detection when transferring data from a source data storage device to a destination data storage device in accordance with one or more of the provisions set forth herein.

Another alternate method may be devised for providing improved speed and error detection when transferring data from a source data storage device to a destination data storage device in a data storage network. FIG. 9 is a flow diagram of an example of this alternate method 900. The example method 900 begins at 902 and involves identifying at 904 one or more efficient priority communications paths in real time by finding one or more open ports on a controller that manages a destination storage drive on the destination data storage device, at 904. In this embodiment, in order to be selected as an efficient priority communications path, the one or more open ports meet one or more predefined criteria that facilitate data transfer at a predefined rate, for example.

In one embodiment, the predefined criteria for the port may include whether or not the port resides on a controller that directly manages the storage drive for the data storage device. That is, the controller comprising the port is on the same device that houses the data storage comprising the drive, such as a LUN, for example. Criteria may also comprise, for example, operator preference, connection speed, utilization percentage (e.g., business or level of activity on the port), stability, etc. Further, the criteria can comprise whether the port is configured to provide data transfer at preferred speeds (e.g., those speeds preferred by an administrator or user to complete data transfers within a selected time). Additionally, the criteria may comprise whether the port is active as a data transfer path for other transfers and/or the degree to which the port is utilized by other systems besides the migration systems. For example, asymmetrical storage arrays can provide different levels of performance per port, where a first controller port may be active to a first degree, and a second controller port may be active to a second degree as a data path for LUN transfer.

At 906 in the example method 900, subsets of the data are concurrently transferred from the source data storage drive to the destination data drive using the one or more efficient priority communications paths. That is, for example, where a plurality of efficient communications paths have been identified, such as by utilizing a plurality of ports on the respective controllers for the source and destination drives, a plurality of data transfers can be performed relatively concurrently (e.g., in parallel). In one embodiment, the data transfer (e.g., a transfer session comprising data from one LUN) can be divided into subsets. In this embodiment, the subsets can be concurrently transferred using a plurality of efficient data paths if they are available. Thus, the number of active slices and transfers per path can be adjusted based on the number and utilization of available paths, At 908, the ports on the controller are monitored in real time (e.g., as the data transfer occurs) to determine if the number of efficient priority communications paths changes. For example, another port may become available (e.g., or one in use may become unavailable) for data transfer on the destination and/or the source controllers based upon some predefined criteria. Similarly, the degree to which a port is utilized can likewise be monitored. For example, the available bandwidth of an open port may double, such that the corresponding path can accommodate an increased throughput, and this additional capacity can be detected and utilized by increasing (e.g., doubling) the number of active slices being transferred. In one embodiment, an administrator may periodically manually search for efficient data paths between the drives, for example, by periodically using mapping path elements (e.g., connections to the network, ports, etc.) between source and destination controllers.

In another embodiment, the monitoring may be performed automatically, such as programmatically, by using a monitoring program to search for efficient paths between the source and destination drives. As an example, if the network components that comprise a data path, such as the controllers, ports, and drives (e.g., LUNs) are enabled for asynchronous LUN access (ALUA), the automated program for searching can utilize ALUA to identify the preferred (e.g., optimized and/or fastest) paths between the controllers.

At 910 in the example method 900, the number of concurrent data subset transfers are dynamically adjusted "on the fly" when the number of efficient priority communications paths changes. That is, for example, as a data transfer session is underway, such as a plurality of subsets of the session being transferred over a plurality of efficient data paths concurrently, the number of paths used for the transfer session can be adjusted to account for the changes identified by the monitoring. In one embodiment, the number of concurrent data subset transfers can be increased if the change in the number of available efficient priority communications paths increases, or the number concurrent data subset transfers can be reduced if the number of available efficient priority communications paths decreases. Similarly, a larger (or smaller) data slice can be transferred over an existing (or new) path where the bandwidth of a corresponding port is found have increased (or decreased). In this manner, a data transfer session can be conducted relatively efficiently because the sum total of data being transferred at any point in time generally corresponds to the upper tolerances/bandwidth of the infrastructure/system. Additionally, the number of active sessions can be "throttled" by the user and/or automatically (effectively limiting the load put on the source and destination storage drives and/or devices) to (pre)determined levels so that the transfers do not have an adverse effect on other systems accessing the same source and/or destination storage drives and/or devices.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include hard drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer readable media may also comprise communication media, which typically embodies computer readable instructions or other data in a modulated data signal such as a carrier wave or other transport mechanism (e.g., that has one or more of its characteristics set or changed in such a manner as to encode information in the signal). The computer readable medium can also be distributed (e.g., using a switching fabric, such as used in computer farms) over a network-coupled computer system so that computer readable code is stored and executed in a distributed fashion.

Figure 10:
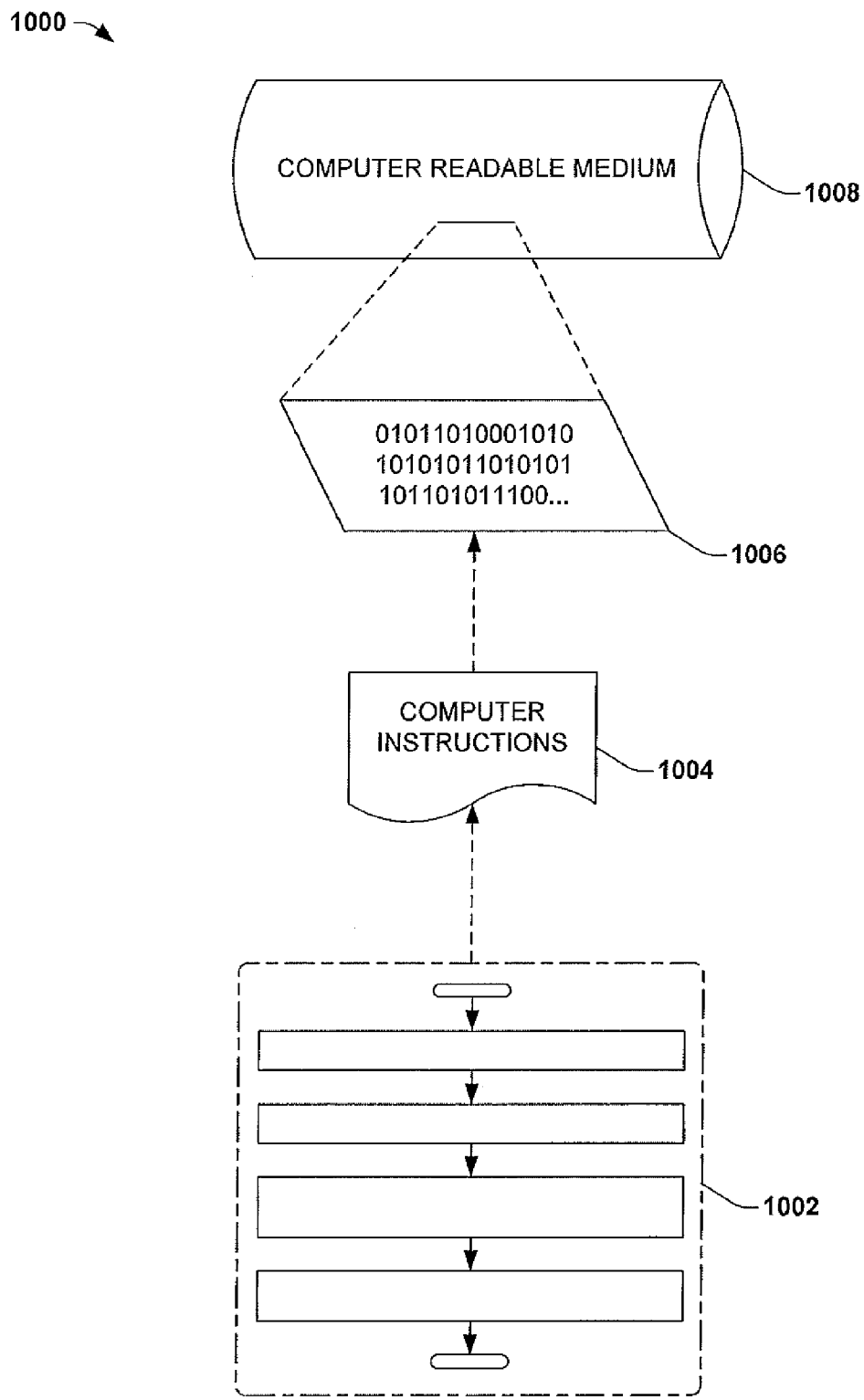
FIG. 10 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 10, where the implementation 1000 comprises a computer-readable medium 1008 (e.g., a CD-R, DVD-R, or a platter of a hard disk drive), on which is encoded computer-readable data 1006. This computer-readable data 1006 in turn comprises a set of computer instructions 1004 configured to operate according to the principles set forth herein. In one such embodiment, the processor-executable instructions 1004 may be configured to perform a method 1002, such as the method 300 of FIG. 3 or method 800 of FIG. 8, for example. Many such computer-readable media may be devised by those of ordinary skill in the art that are configured to operate in accordance with the techniques presented herein.

Moreover, unless specified to the contrary, the term "or" is intended to mean an inclusive "or" rather than an exclusive "or", and the articles "a" and "an" are generally to be construed to comprise "one or more". Furthermore, to the extent that the terms "includes", "having", "has", "with", or variants thereof are used, such terms are intended to be inclusive in a manner similar to the term "comprising".

What is claimed is:

1. A method for migrating data from a source data storage device to a destination data storage device in a data storage network, comprising:
    identifying a first controller coupled to a data storage network that owns a source data storage device and a second controller coupled to the data storage network that owns a destination data storage device;
    determining one or more migration paths from the source data storage device to the destination data storage device using one or more ports of the first controller and one or more ports of the second controller;
    generating a transfer session comprising a plurality of data slices that are to be transferred from the source data storage device to the destination data storage device along at least one of the one or more migration paths;
    prior to beginning a transfer of the plurality of data slices from the source data storage device to the destination data storage device:
        allocating a first portion of the plurality of data slices to a first port of the first controller based upon a present utilization of the first port; and
        allocating a second portion of the plurality of data slices to a second port of the first controller based upon a present utilization of the second port; and
    concurrently transferring a first data slice of the first portion and a second data slice of the second portion from the source data storage device to the destination data storage device, the concurrently transferring comprising:
        transferring the first data slice across a first migration path using the first port of the first controller and a first port of the second controller; and
        transferring the second data slice across a second migration path, concurrently during transfer of the first data slice across the first migration path, using the second port of the first controller and a second port of the second controller.

2. The method of claim 1, comprising:
    dynamically adjusting, in real-time, at least one of a number of data slices concurrently transferred or a slice size of a data slice of the plurality based upon at least one of a utilization of the one or more ports of the first controller or a utilization of the one or more ports of the second controller.

3. The method of claim 1, comprising:
    adjusting a first number of data slices associated with the first portion to comprise a smaller number of data slices than a second number of data slices associated with the second portion based upon utilization of the first port exceeding utilization of the second port.

4. The method of claim 1, comprising:
    reducing a first slice size of the first data slice transferred across the first migration path in relation to a second slice size of the second data slice transferred across the second migration path based upon utilization of the first port exceeding utilization of the second port.

5. The method of claim 2, the dynamically adjusting comprising:
    responsive to an identification of an under-utilized port, increasing the slice size of the data slice.

6. The method of claim 2, the dynamically adjusting comprising:
    responsive to an identification of an under-utilized port, increasing the number of data slices concurrently transferred.

7. The method of claim 2, the dynamically adjusting comprising:
    responsive to an identification of an over-utilized port, decreasing the slice size of the data slice.

8. The method of claim 2, the dynamically adjusting comprising:
    responsive to an identification of an over-utilized port, decreasing the number of data slices concurrently transferred.

9. A system for migrating data from a source data storage device to a destination data storage device in a data storage network, comprising:
    a migration component configured to:
        identify a first controller coupled to a data storage network that owns a source data storage device and a second controller coupled to the data storage network that owns a destination data storage device;
        determine one or more migration paths from the source data storage device to the destination data storage device using one or more ports of the first controller and one or more ports of the second controller;
        generate a transfer session comprising a plurality of data slices that are to be transferred from the source data storage device to the destination data storage device along at least one of the one or more migration paths;
        prior to beginning a transfer of the plurality of data slices from the source data storage device to the destination data storage device:
            allocate a first portion of the plurality of data slices to a first port of the first controller based upon a present utilization of the first port; and
            allocate a second portion of the plurality of data slices to a second port of the first controller based upon a present utilization of the second port; and
        concurrently transfer a first data slice of the first portion and a second data slice of the second portion from the source data storage device to the destination data storage device, the concurrently transferring comprising:
            transferring the first data slice across a first migration path using the first port of the first controller and a first port of the second controller; and
            transferring the second data slice across a second migration path, concurrently during transfer of the first data slice across the first migration path, using the second port of the first controller and a second port of the second controller.

10. The system of claim 9, the migration component configured to:
    dynamically adjust, in real-time, at least one of a number of data slices concurrently transferred or a slice size of a data slice of the plurality based upon at least one of a utilization of the one or more ports of the first controller or a utilization of the one or more ports of the second controller.

11. The system of claim 9, the migration component configured to:
    adjust a first number of data slices associated with the first portion to comprise a smaller number of data slices than a second number of data slices associated with the second portion based upon utilization of the first port exceeding utilization of the second port.

12. The system of claim 9, the migration component configured to:
    reduce a first slice size of the first data slice transferred across the first migration path in relation to a second slice size of the second data slice transferred across the second migration path based upon utilization of the first port exceeding utilization of the second port.

13. The system of claim 9, the migration component configured to:
    detect a copy error associated with a data slice of the plurality transferred from the source data storage device to the destination data storage device.

14. The system of claim 10, the migration component configured to:
    responsive to an identification of an under-utilized port, increase the slice size of the data slice.

15. The system of claim 10, the migration component configured to:
    responsive to an identification of an under-utilized port, increase the number of data slices concurrently transferred.

16. The system of claim 10, the migration component configured to:
    responsive to an identification of an over-utilized port, decrease the slice size of the data slice.

17. The system of claim 10, the migration component configured to:
    responsive to an identification of an over-utilized port, decrease the number of data slices concurrently transferred.

18. The system of claim 13, the migration component configured to:
    compare source data, corresponding to the data slice from the source data storage device, and destination data, corresponding to the data slice from the destination data storage device, to detect the copy error.

19. A method for migrating data from a source data storage device to a destination data storage device in a data storage network, comprising:
    identifying a first controller coupled to a data storage network that owns a source data storage device and a second controller coupled to the data storage network that owns a destination data storage device;
    determining a first migration path and a second migration path from the source data storage device to the destination data storage device, the first migration path using a first port of the first controller and a first port of the second controller, the second migration path using a second port of the first controller and a second port of the second controller;
    prior to beginning a transfer of a plurality of data slices from the source data storage device to the destination data storage device:
        allocating a first portion of the plurality of data slices to a first port of the first controller based upon a present utilization of the first port; and
        allocating a second portion of the plurality of data slices to a second port of the first controller based upon a present utilization of the second port; and
    concurrently transferring a first data slice of the first portion and a second data slice of the second portion, through the data storage network utilizing a data storage network protocol, from the source data storage device to the destination data storage device, the concurrently transferring comprising:
        transferring the first data slice across the first migration path; and
        transferring the second data slice across the second migration path, concurrently during transfer of the first data slice across the first migration path.

20. A system for migrating data from a source data storage device to a destination data storage device in a data storage network, comprising:
    a migration component configured to:
        identify a first controller coupled to a data storage network that owns a source data storage device and a second controller coupled to the data storage network that owns a destination data storage device;
        determine a first migration path and a second migration path from the source data storage device to the destination data storage device, the first migration path using a first port of the first controller and a first port of the second controller, the second migration path using a second port of the first controller and a second port of the second controller;
        prior to beginning a transfer of a plurality of data slices from the source data storage device to the destination data storage device:
            allocate a first portion of the plurality of data slices to a first port of the first controller based upon a present utilization of the first port; and
            allocate a second portion of the plurality of data slices to a second port of the first controller based upon a present utilization of the second port; and
        concurrently transfer a first data slice of the first portion and a second data slice of the second portion, through the data storage network utilizing a data storage network protocol, from the source data storage device to the destination data storage device, the concurrently transferring comprising:
            transferring the first data slice across the first migration path; and
            transferring the second data slice across the second migration path, concurrently during transfer of the first data slice across the first migration path.

* * * * *